(12) United States Patent
Rinaldi et al.

(10) Patent No.: US 7,396,924 B2
(45) Date of Patent: *Jul. 8, 2008

(54) BUILDING ADDITIVES BASED ON PURIFIED HYDROXYALKYL GUAR

(75) Inventors: Cristina Rinaldi, Milan (IT); Ugo Pfeiffer, Milan (IT); Giuseppe Molteni, Varese (IT); Giuseppe Li Bassi, Gavirate (IT)

(73) Assignee: Lamberti SpA, Albizzate (IT)

( * ) Notice: Subject to any disclaimer, the term of this patent is extended or adjusted under 35 U.S.C. 154(b) by 378 days.

This patent is subject to a terminal disclaimer.

(21) Appl. No.: 10/508,320

(22) PCT Filed: Mar. 12, 2003

(86) PCT No.: PCT/EP03/02539

§ 371 (c)(1),
(2), (4) Date: Sep. 17, 2004

(87) PCT Pub. No.: WO03/078473

PCT Pub. Date: Sep. 25, 2003

(65) Prior Publication Data

US 2005/0143558 A1   Jun. 30, 2005

(30) Foreign Application Priority Data

Mar. 18, 2002   (IT)   .......................... VA2002A0023

(51) Int. Cl.
*C07B 37/00* (2006.01)
*C12P 19/06* (2006.01)
(52) U.S. Cl. .................................... 536/123; 536/123.1
(58) Field of Classification Search ................ 514/102, 514/104, 111, 114
See application file for complete search history.

(56) References Cited

U.S. PATENT DOCUMENTS

| 3,350,386 | A | * | 10/1967 | Engelskirchen et al. ..... 536/114 |
| 4,028,127 | A |   | 6/1977  | Maske et al. ................ 106/111 |
| 5,082,579 | A |   | 1/1992  | Dawson .................... 252/8.551 |

FOREIGN PATENT DOCUMENTS

EP   0323627   * 12/1988

OTHER PUBLICATIONS

U.S. Appl. No. 10/543,068, filed Nov. 2006, Rinaldi et al.*
U.S. Appl. No. 10/508,274, filed Aug. 2005, Rinaldi et al.*
Farid Hamedi Sangsari et al.; *Competitive hemiacetalization and acetalization: corss-linking of cellulose by glyoxal* Recl. Trav. Chim. Pays-Bas 109, (1990) pp. 419-424.

* cited by examiner

*Primary Examiner*—Shaojia Anna Jiang
*Assistant Examiner*—Eric S Olson
(74) *Attorney, Agent, or Firm*—Madan, Mossman & Sriram, P.C.

(57) ABSTRACT

The present invention relates to highly hydroxyalkylated, glyoxal crosslinked, purified hydroxyalkyl guar useful as additive in the building industry, and to a method for its preparation.

18 Claims, No Drawings

BUILDING ADDITIVES BASED ON PURIFIED HYDROXYALKYL GUAR

This application is a national stage application of PCT/EP03/02539, filed Mar. 12, 2003, which claims priority to foreign application IT VA2002 A 000023, filed Mar. 18, 2002.

The present invention is directed to a purified hydroxyalkyl guar useful as an additive for building products, i.e. as thickener and rheology modifier for water-based paints and varnishes, for dry blend of gypsum or cement for wall coverings, mortars, adhesives.

In more detail, the hydroxyalkyl guar of the invention is highly hdroxyalkylated, crosslinked by means of a di-aldehyde and purified.

The invention further relates to a method for the preparation of said additives.

The additives of the invention exhibit the technological advantage to be water soluble only at alkaline pH and to provide, when dissolved in water, a very high viscosity, which cannot be obtained with similar products.

Furthermore, the stability of the viscosity is improved and the thickened solution is more resistant to thermal degradation.

Hydroxyalkyl guar derivatives are widely used in the most different industrial applications.

They are obtained by chemical reaction of the hydroxyl groups of the galactomannan polysaccharide, which is normally known as "guar gum"0 or "guar", with alkylene oxides (ethylene, propylene, butylene or higher oxides), in the presence of an alkaline catalyst (such as sodium hydroxide).

Further substitution can be introduced by reaction with epoxides or with long chain glycidyl ethers.

Guar gum is made by the thermo-mechanical treatment of the seeds of *Cyamopsis Tetragonolobus* (L.) Taub., a leguminosae cultivated in the semi-dry region of tropical countries, particularly in India and in Pakistan. It is usually found in the form of "splits", that are the endosperms of the seed deprived from the husk and from the inner proteinic part, the germ, or in the form of powder of different particle-size, which is obtained from the splits by milling.

The guar gum galactomannan consists of a main linear chain of poly-mannose bearing branches of galactose units in a molar ratio of about 2:1. Each ring of the monosaccharide bears three free hydroxyl groups that are available for chemical reaction, two of them being in the "cis"0 position.

In FIG. 1, the main structure of galactomannans is reported; the mannose units are in the main chain and the galactose units are in the branches. For guar gum, in particular, the value of the two coefficients x and y is 1.

FIG. 1
Main Structure of the galactomannans

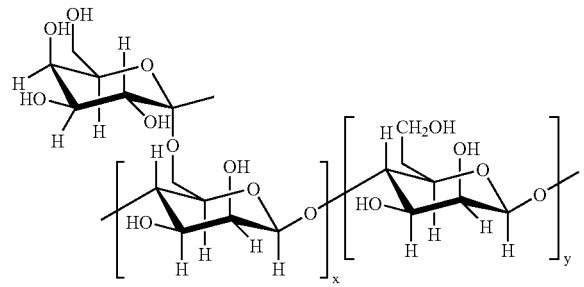

The hydroxyalkyl guar derivatives are used in the most different industrial applications, such as, merely by way of example, in the preparation of printing pastes, in the silk-screen printing of textiles (cotton, wool, silk, etc.); in the formulation of water-based paints and varnishes; in the preparation of gypsum or cement based blends, wall coverings, adhesives for tiles; in the preparation of cleaning products or of cosmetics or personal care products, such as shampoos, hair conditioners, skin creams; in the paper industry; in oil drilling; in the preparation of explosives; in the preparation of water-based solutions for fire fighting.

In all these applications, the thickening property of the hydroxyalkyl guar derivatives and their characteristics of rheology modifiers for aqueous solutions are exploited.

Among the users, there still exists a substantial technological need for additives capable of imparting very high viscosity to their aqueous solution. The commercially available additives roughly belong to two categories: crude products, that is, products still containing the undesired by-products generated during their chemical preparation (glycols, polyglycols, inorganic salts) and products purified by means of crosslinking with boric acid or its salts.

The function of the crosslinking with boric acid is to induce the borate anion to form bridges between the chains of the polysaccharide, thus making the polysaccharide itself insoluble in water.

The borate bridges are stable at alkaline pH and in this condition the product can be purified from its by-products.

At acid pH, the borate linkages are broken, the product becomes soluble and can thus be used as a thickener.

The purified product, possessing a higher percentage of active substance than the crude product, clearly exhibits better thickening and rheological characteristics.

The limit of the method of purification by means of boric acid is that it is only applicable with products which are used at acid or nearly acid pH, in that, as it was said above, the products treated with borate are insoluble at pH greater than 7.

Many different crude hydroxyalkyl guar derivatives are commercially available, and by way of example we are reporting here below some of their trade names, chemical nature, typical Brookfield viscosity values at 2%, 20 rpm and 20° C.:

Esacol OR 18 (Lamberti SpA), HPG, MS about 0.8:
viscosity 8000-11000 mPas;
Esacol HM 22 (Lamberti SpA), hydrophobically modified HPG, MS 1.3:
viscosity 16000-19000 mPas;
Indalca AC 40 (Cesalpinia Chemicals SpA), HEG, MS 0.2-0.25:
viscosity 4000-5000 mpas;
Polycol WP 10 (Polygal), HPG, MS about 0.6:
viscosity 9900-12100 mPAS;
Polycol WP 15 (Polygal), HPG, MS about 0.6:
viscosity 11000-13000 mPas;
Agocel I 115D (Agochemical), HPG, MS about 1.1:
viscosity 3500-4000 mPas.

In the present text with the acronyms HPG, HEG and MS we mean, respectively, hydroxypropyl guar, hydroxyethyl guar and molar substitution (moles of alkyl groups/moles of monosaccharidic unit).

One of the industrial fields wherein very high thickening properties are needed is the field of water-based paints and varnishes; paints and varnishes are usually formulated at pH higher than 8 and in this interval it is not possible to use additives purified by means of boric acid.

Another very interesting field is the field of dry-mixed compounds based on hydraulic binders, wherein the water retaining thickener should be capable to impart both adhesion and workability and should be an effective thickener even if the pH, in the aqueous mixture which is prepared before application, is highly alkaline.

The attempt to use a purification process by, first, crosslinking with glyoxal, which is stable at neutral or acid pH and can be removed at alkaline pH, is and, then, applying a washing step, was unsuccessful, as the crosslinking with glyoxal is difficult to control.

As a matter of fact, crosslinking is obtained through the formation of acetalic and hemiacetalic linkages between the carboxyls of the aldehydic groups and the hydroxyls of the galactose and mannose units.

The equilibria of the various species, unlinked, hemiacetalic and acetalic, are very rapid, complex and are governed by different factors such as the temperature, their relative concentration, the pH, as it is described, by way of example, in Recl. Trav. Chim. Pays-Bas 109, 419-424 (1990).

A typical problem arises from the fact that if the amount of glyoxal is low (lower than 2%) the product does not maintain its insolubility for the time that is necessary for an industrial washing step.

By increasing, even little, the amount of glyoxal, (to about 4%), the obtained product, perhaps because of intermolecular rearrangements taking place during the washing step leading to very stable acetalic linkages, becomes totally or almost totally insoluble, even at the pH of use which is higher then 8.

In the state of the art, after having attempted to purify the hydroxyalkyl guar by means of glyoxal crosslinking and subsequent washing, it is preferred to use directly the crude crosslinked product without washing it, as it is described by way of example in U.S. Pat. No. 5,082,579 or in U.S. Pat. No. 4,028,127.

It has now been found that it is possible to obtain a purified hydroxyalkyl guar useful as additive for building products, by operating as it is here below described:
a) a hydroxyalkyl guar having a molar substitution between 0.4 and 2.0 is treated in the solid form with an amount of glyoxal of from 2 to 3% by weight, in the form of an aqueous solution at a pH<6, at ambient temperature;
b) when this treatment is ended, the thus obtained product is washed with water at pH<6 from 30 to 90 minutes, and then dried and milled.

The thus purified hydroxyalkyl guar contains an amount of glyoxal ranging typically from 0.3 to 1.5% by weight, preferably from 0.5 to 0.8% by weight, that does not alter its industrial applicability in the building industry. Preferably, the hydroxyalkyl guar useful for the realization of the present invention is selected in the group consisting of hydroxypropyl guar, hydroxyethyl guar and hydroxybutyl guar.

These products are commercialized by Lamberti SpA under the generic trade name Esacol.

In the preferred forms of realization of the present invention, the amount of glyoxal to be added is comprised between 2.2 and 2.8% by weight.

According to a fundamental aspect of the invention the washing of step b) permits to remove at least 90% of the by-products, that were originally present in an amount up to 25% by weight.

The thus obtained product is not soluble at pH<7 and quickly and completely dissolvable when the pH is risen to values higher than 8.

According to a fundamental aspect of the present invention, the purified hydroxyalkyl guar useful as additive for building products is characterized by the fact that it contains from 0.3 to 1.5%, and preferably from 0.5 to 0.8%, by weight of glyoxal, that it is soluble at pH>8, that its molar substitution is between 0.4 and 2.0, preferably between 0.7 and 1.5, and that it exhibits a Brookfield viscosity at 20° C., 20 rpm and 2% by weight higher than 20000 mpas.

As it was previously indicated above while describing the process, particularly preferred are the hydroxyalkyl guar derivatives wherein the hydroxyalkyl group is hydroxypropyl, hydroxyethyl, hydroxybutyl.

Furthermore, and surprisingly, the value of the viscosity of the aqueous solutions containing the purified hydroxyalkyl guar of the invention is higher than the one expected on the basis of the increase of active substance due to the purification process.

Another relevant aspect of the present invention is that the viscosity of the aqueous solutions of the purified hydroxyalkyl guar of the invention exhibits an improved thermal stability in comparison with the one shown by a solution containing the same amount of the same crude hydroxyalylated polysaccharide.

The capability of imparting high viscosity to aqueous solution and to maintain such high viscosity during the time, even under thermal stress, constitutes a characteristic aspect of the additives of the invention that make them particularly suited to the use in formulations for the building industry.

These characteristics allow to reduce the amount of additive in the formulations and to improve the reproducibility of such formulations together with their storage limits.

EXAMPLE 1

10 Kg of hydroxypropyl guar having an MS of 0.8 (determined by 1H-NMR) and a Brookfield viscosity of 10000 mPas (20 rpm, 20° C., 2% by weight), with a content of water of 8.1% by weight, are stirred in a 50 liters reactor with a mixture of 3.5 Kg of isopropanol, 1.5 Kg of water and 0.2 Kg of acetic acid 80%, for 45 minutes.

The pH is then measured and its value is about 5.

The atmosphere is made inert by washing with vacuum/nitrogen cycles.

A 40% by weight aqueous solution of glyoxal is then added, in order to obtain a total percentage of glyoxal of 2.3% by weigt based on the amount of hydroxypropyl guar; the temperature is then risen to 40° C. and the mixture is stirred for about 1 hour at a temperature of between 40° C. and 50° C.

133 g of the thus obtained reaction mixture (2.3% glyoxalated crude HPG), with a content of water of 25% by weight, are dispersed in 360 g of acidulous water (at pH about 5), left under stirring for 30 minutes and then vacuum filtered (0.4-0.5 atm).

The filtered wet product is then washed by adding 240 g of acidulous water directly on it and applying vacuum.

The product (2.3% glyoxalated purified HPG) is dried on a fluid bed dryer with warm air until the content of water is about 3% by weight and then milled; its content of ashes is determined and it is equal to 0.79% by weight.

The content of linked glyoxal is determined by reaction with 2-hydrazono-2,3-dihydro-3-methylbenzothiazole chloridrate, according to the method described in "Kunststoffe im Lebensmittelverkehr" Ed. Carl Hetmanns Verlag KG, 1999, pag. 228-231 and it is equal to 0.78% by weight.

Analogously the following samples are prepared:
0.24% glyoxalated crude HPG;
4% glyoxalated crude HPG.

The attempts to perform the above described purification was unsuccessful with the 0.24% and 4% glyoxalated crude hydroxypropyl guar because, in the case of the 0.24% glyoxalated HPG, the product dissolves itself during the washing step, and in the case of the 4% glyoxalated HPG, the product is permanently partially insoluble.

EXAMPLE 2

The Brookfield viscosities, at 20° C. and 20 rpm, of 2% aqueous solution of the products prepared as described in Example 1 were measured. The concentration value of the solutions was obtained by dosing the crude products taking into account their active content. To obtain the reported alkaline pH values 1% aq. NaOH was added to the solutions. The viscosities are reported in the following Table 1.

TABLE 1

| Product | Time (h) | pH | Viscosity (mPas) | Note |
| --- | --- | --- | --- | --- |
| 0.24% glyoxalated crude HPG | 2 | 5 | — | insoluble |
| 0.24% glyoxalated crude HPG | 2 | 9 | 18500 | soluble |
| 0.24% glyoxalated crude HOPG | 24 | 9 | 19100 | soluble |
| 4% glyoxalated crude HPG | 2 | 9 | 350 | insoluble |
| 2.3% glyoxalated purified HPG | 2 | 5 | — | insoluble |
| 2.3% glyoxalated purified HPG | 2 | 9 | 20600 | soluble |
| 2.3% glyoxalated purified HPG | 48 | 9 | 20900 | soluble |

To verify the thermal resistance of the viscosity of the two solutions containing respectively 2% by weight of 2.3% glyoxalated purified HPG and 2% by weight of of 0.24% glyoxalated crude HPG, a sample of both solutions is kept for 24 hours at 75° C.

The viscosity of the two solutions is measured at 20° C. and 20 rpm before ($V_o$) and after ($V_{24}$) this thermal treatment. The values are reported in Table 2.

TABLE 2

| Product | Vo (mPas) | $V_{24}$ (mPas) | % Resistance ($V_{24}/V_o$) × 100 |
| --- | --- | --- | --- |
| 2.3% glyoxalated purified HPG | 20500 | 12500 | 61 |
| 0.24% glyoxalated crude HPG | 18600 | 6700 | 36 |

The invention claimed is:

1. A dry purified hydroxyalkyl guar product, useful as an additive for building products and characterized by the facts: that it contains from 0.3 to 1.5% by weight of glyoxal; that it is not soluble at pH<7 and quickly and completely soluble at pH>8; that its molar substitution is between 0.4 and 2.0; and that it exhibits a Brookfield viscosity at alkaline pH, 20° C., 20 rpm and 2% by weight of higher than 20,000 mPa.

2. The hydroxyalkyl guar according to claim 1, characterized by the fact that its molar substitution is between 0.7 and 1.5.

3. The hydroxyalkyl guar according to claim 1, characterized by the fact that it contains from 0.5 to 0.8% by weight of glyoxal.

4. The hydroxyalkyl guar according to claim 2, characterized by the fact that it contains from 0.5 to 0.8% by weight of glyoxal.

5. The hydroxyalkyl guar according to claim 1 wherein the hydroxyalkyl group is hydroxypropyl.

6. The hydroxyalkyl guar according to claim 2 wherein the hydroxyalkyl group is hydroxypropyl.

7. The hydroxyalkyl guar according to claim 1 wherein the hydroxyalkyl group is hydroxyethyl.

8. The hydroxyalkyl guar according to claim 2 wherein the hydroxyalkyl group is hydroxyethyl.

9. The hydroxyalkyl guar according to claim 1 wherein the hydroxyalkyl group is hydroxybutyl.

10. The hydroxyalkyl guar according to claim 2 wherein the hydroxyalkyl group is hydroxybutyl.

11. A process for the preparation of a dry purified hydroxyalkyl guar product useful as an additive for building products comprising:
   a) treating, at ambient temperature, a hydroxyalkyl guar in the solid form and having a molar substitution of between 0.4 and 2.0, with an amount of glyoxal of from 2 to 3% by weight and in the form of an aaueous solution at a pH<6;
   b) washing the product of step a) with water at pH<6, for from 30 to 90 minutes, and then drying and milling it; wherein the dry purified hydroxyalkyl guar product is not soluble at pH<7 and quickly and completely soluble at pH>8.

12. The process of claim 11, wherein the hydroxyalkyl guar has a molar substitution of between 0.7 and 1.5.

13. The process of claim 11 wherein the hydroxyalkyl guar is selected from the group consisting of hydroxypropyl guar, hydroxyethyl guar and hydroxybutyl guar.

14. The process of claim 12 wherein the hydroxyalkyl guar is selected from the group consisting of hydroxypropyl guar, hydroxyethyl guar and hydroxybutyl guar.

15. The process of claim 11 wherein the amount of glyoxal is between 2.2 and 2.8% by weight.

16. The process of claim 12 wherein the amount of glyoxal is between 2.2 and 2.8% by weight.

17. The process of claim 11 wherein the aqueous washing of step b) eliminates at least 90% of the original impurities.

18. The process of claim 12 wherein the aqueous washing of step b) eliminates at least 90% of the original impurities.

* * * * *